United States Patent [19]
Gluntz et al.

[11] Patent Number: 5,085,825
[45] Date of Patent: Feb. 4, 1992

[54] STANDBY SAFETY INJECTION SYSTEM FOR NUCLEAR REACTOR PLANTS

[75] Inventors: Douglas M. Gluntz; Mauro Caviglione, both of San Jose, Calif.

[73] Assignee: General Electric Company, San Jose, Calif.

[21] Appl. No.: 695,116

[22] Filed: May 3, 1991

[51] Int. Cl.[5] .................................. G21C 9/02
[52] U.S. Cl. ........................... 376/282; 376/298
[58] Field of Search ............... 376/282, 298; 376/299

[56] References Cited

U.S. PATENT DOCUMENTS

| | | | |
|---|---|---|---|
| 4,753,771 | 6/1988 | Conway et al. | 376/282 |
| 4,784,824 | 11/1988 | Gandrille | 376/282 |

Primary Examiner—Brooks H. Hunt
Assistant Examiner—Frederick H. Voss

[57] ABSTRACT

A multiple liquid standby safety injection system for nuclear fission reactor plants comprising means for injecting supplemental coolant water into the nuclear reactor pressure vessel to cool the fuel core and means for injecting a water solution of a neutron absorbing compound into the nuclear reactor pressure vessel about the fuel core to diminish the fission reaction. The coolant water and solution of neutron absorbent each comprise individual systems and are conveyed from their respective supply container by means of pressurized propelling gas. The individual standby safety injection systems for coolant water and solution are integrated with means for transferring propelling gas from one supply container to the other to enhance the source and available volume of liquid propelling gas for either system by drawing from the other.

16 Claims, 2 Drawing Sheets

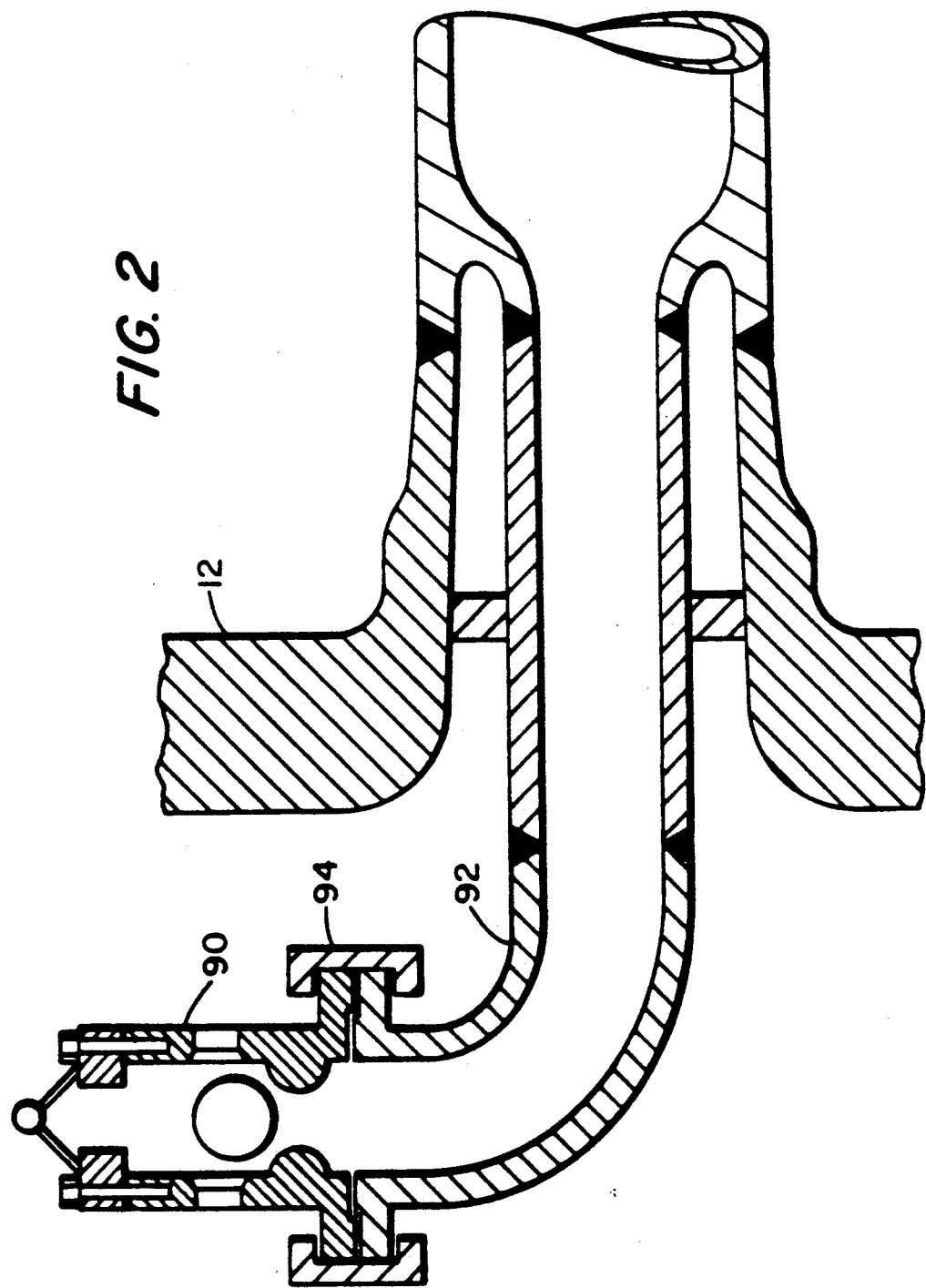

STANDBY SAFETY INJECTION SYSTEM FOR NUCLEAR REACTOR PLANTS

FIELD OF THE INVENTION

This invention relates to water cooled nuclear fission reactors of the so-called boiling water type. Boiling water nuclear reactors comprise a steam generating plant wherein reactor water coolant is circulated through a core of heat producing fissionable nuclear fuel to transfer thermal energy from the fuel to the coolant and produce steam. The steam is then used to drive turbines and other machinery employing steam, such as for electrical power generation.

BACKGROUND OF THE INVENTION

Due to the prodigious quantities of thermal energy produced by fissioning nuclear fuel, it is imperative to maintain the fuel core of commercial water cooled nuclear fission reactors submerged within heat transferring coolant water. The conveyance of heat out away from the energy producing fuel core by means of a fluid coolant is needed to preclude the possibility of hazardous conditions or reactor damage such as could occur with an overheating meltdown within the fuel core unit.

Such a potentially destructive occurrence can result from a loss-of-coolant accident (LOCA) caused by an extensive breach of a major reactor coolant receptacle or conduit. To cope with this hypothetical accidental event, commercial water cooled nuclear fission reactors are provided with large reservoirs of water and dedicated safety injection systems(s) capable of supplying supplementary coolant water to the reactor vessel for cooling the fuel core and maintaining lower or normal operating temperatures. Typically, automatic safety measures are employed to activate and operate systems for supplying this supplementary coolant water as needed to the fuel core to replace or supplement the original coolant water lost due to some mishap.

A different but additional safety measure commonly employed in commercial water cooled nuclear fission reactors comprises means to deal with any failure of the reactor control rods to effectively perform their designed fission regulating function. Nuclear reactor control rods, comprising elongated units containing neutron absorbing material such as boron or a compound thereof, are designed to be reciprocally movable into and out from the fuel core of fissionable material. The level of fission activity of the fuel material in a core of a reactor, and in turn heat produced, is determined or controlled by the amount of neutron absorbent advanced into or withdrawn from the fuel core with the control rod units. Moreover, the fission reaction of the plant can be rendered subcritical or terminated by inserting sufficient neutron absorbent material housed within control rods into the fuel core to deprive the fuel of the needed quantity of fission produced neutrons for maintaining the self perpetuating fission reaction, or so-called chain reaction, and in turn heat produced.

However, in the event that the control rods fail to perform their intended role of governing and/or ceasing the fission reaction for any cause, mechanical, electrical or personnel malfunction, an auxiliary backup system is frequently provided for depriving the fuel core of the neutrons essential for maintenance of the heat producing fission reaction. Commonly this system comprises a supply of a water solution of a soluble boron or gadolinium compound, or so-called poison, which when introduced into the nuclear reactor vessel, merges with the reactor coolant and thus pervades the fuel core region to absorb the fission produced neutrons needed for continuing the fission reaction. Thus, in the remote event of any control rod failure, the poison solution is fed from a reservoir into the reactor vessel by suitable means on a signal of problem whereupon the fission reaction is terminated.

A typical arrangement in commercial water cooled nuclear fission reactor plants for incorporating the foregoing standby safety systems which inject auxiliary coolant water to temper the fuel core temperature, or inject a neutron absorbing solution to deprive the fuel of neutrons, utilized an apt gas, such as nitrogen, for a propellant to drive the liquid water or boron solution from its source or reservoir through communicating conduits into the reactor vessel. Thus, auxiliary coolant water or poison solution is maintained within a closed vessel or tank under sufficient gas pressure to drive the liquid contents into the reactor vessel through an appropriate arrangement of conduits upon a manually or automatically actuated signal responding to a malfunction.

SUMMARY OF THE INVENTION

This invention comprises an improvement in a standby safety injection system for water cooled, nuclear fission reactor plants. The improvement of the invention enhances the injection delivery means, and includes a connecting of the reservoirs of two safety systems to provide an alternative auxiliary source of propelling gas for each system. Additionally this invention comprises a unique arrangement of control valves and fluid conduits joined with sensing means for initiating the standby safety injection units of either system into appropriate action for dealing with a reactor emergency or malfunction.

OBJECTS OF THE INVENTION

It is a primary object of this invention to provide an improved dual liquid standby safety injection system for nuclear fission reactor plants.

It is an additional object of this invention to provide a liquid standby safety injection system for water cooled nuclear fission reactor plants having an alternative auxiliary source of propelling gas.

It is a further object of this invention to provide a multiple liquid standby safety injection system for water cooled nuclear fission reactor plants having an improved gas propellant and application system that enhances performance as well as economic benefits.

It is a still further object of this invention to provide a liquid standby safety injection system for water cooled nuclear fission reactor plants having an improved arrangement of fluid conveying conduits and flow controlling valves.

It is also an object of this invention to provide improved multiple liquid standby safety injection systems for water cooled nuclear fission reactor plants providing for alternate application of coolant or neutron absorbent with a common source of propellant gas selectively applied or transferred, coupled with a unique arrangement of fluid transferring conduits and flow controlling valves combined with operating sensors.

BRIEF DESCRIPTION OF THE DRAWINGS

FIG. 2 of the drawing comprises a cross sectional view of one type of control valve comprising a part of the subject invention.

DETAILED DESCRIPTION OF THE INVENTION

Figure 1:
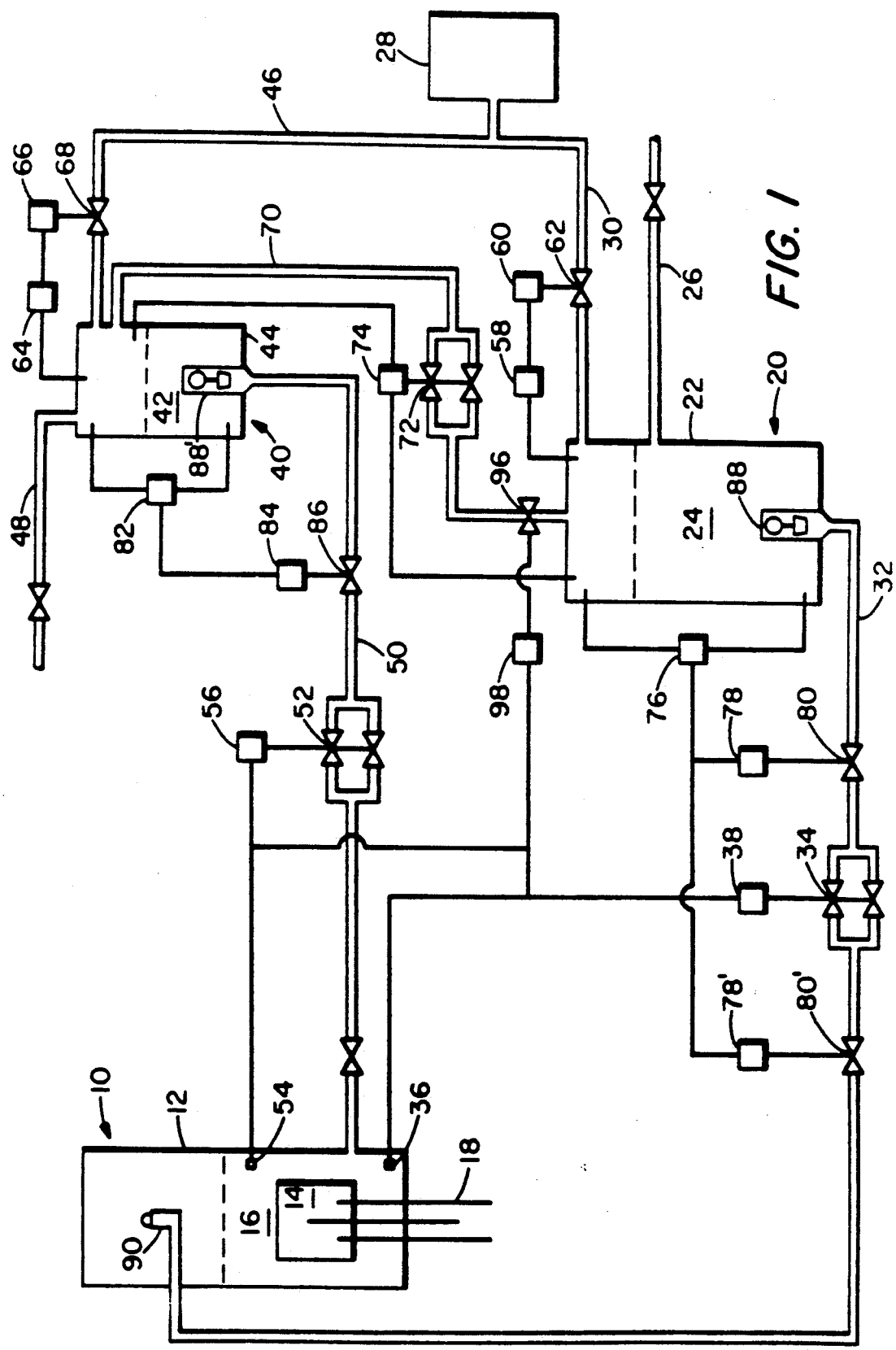
FIG. 1 of the drawing comprises a flow diagram of a nuclear fission reactor illustrating the improved multiple liquid standby safety injection system of the invention.

Referring to FIG. 1 of the drawing, a water cooled nuclear fission reactor plant 10 includes a reactor pressure vessel 12, containing a core of fissionable fuel material 14, such as enriched uranium oxide pellets contained within sealed metal tubes grouped into conveniently sized bundles. The bundles are arranged in a same-orientation pattern generally comprising collectively as a right circular cylinder of nominally comparable cylindrical length and diameter dimensions. During reactor power generation operations, the neutron incited fission reaction of the fuel material is controlled by neutron-absorbent control rods or blades positioned into appropriate amounts and patterns of control rod withdrawal to produce prodigious amounts of thermal energy. The core of fuel assemblies is substantially submerged in water coolant 16 which circulates through the fuel core 14 to carry away heat and form steam for work, such as driving a turbine for generating electrical power. Control rods 18 containing a neutron absorbing material such boron, are reciprocally moveable into and out from the fuel core 14 to control or govern the rate of the neutron incited fission reaction of the fuel, or to terminate the reaction. This in turn safely regulates the quantities of heat produced for work.

Typically such nuclear reactor plants 10 are provided with an auxiliary cooling water system 20, including a supplementary cooling water reservoir tank 22 or vessel containing a standby supply of supplementary water coolant 24. Tank 22 can be resupplied with water 24 through fluid conduit 26 from a suitable source (not shown).

Cooling water auxiliary systems 20 are commonly charged with a propellant gas under pressure, such as nitrogen, as a means for driving supplementary water coolant 24 from a reservoir tank 22 to the reactor vessel 12. A propellant gas is provided for supplementary coolant reservoir tank 22 from high pressure gas supply tank 28 through fluid conduit 30. Thus supplementary coolant water 24 can be forced by the pressurized gas propellant from reservoir tank 22 through fluid conduit 32 and injected into the reactor vessel 12 to replace the operating reactor coolant water 16 covering the fuel core 14 when that coolant is abruptly lost due to a major breach in the coolant circulating system.

The transfer of supplementary coolant water 24 from reservoir tank 22 through conduit 32 to the reactor vessel 12 is controlled by a flow injection valve 34 provided in conduit 32 which opens in response to a signal from a sensing device 36 located within the reactor circulating system which is passed to a valve actuating means 38 operating flow injection valve 34.

Commonly these nuclear reactor plants 10 are also provided with an emergency neutron absorption system 40, comprising a supply of a neutron absorbing water solution 42, such as a water soluble boron compound, held ready in a supply tank 44 or vessel. Tank 44 can be resupplied with the neutron absorbing aqueous solution through fluid conduit 48 from a suitable source (not shown).

Emergency neutron absorbing systems 40 are also commonly charged with a propellant gas under pressure, such as nitrogen, as a means for driving the emergency neutron absorbing solution 42 from the supply tank 44 to the reactor vessel 12. The propellant gas can be provided to the neutron absorption solution supply tank 44 from high pressure gas supply tank 28 through gas conduit 46. Thus emergency neutron absorbing solution 42 can be forced by pressurized gas propellant from supply tank 44 though fluid conduit 50 and injected into the reactor vessel 12 to envelop the fuel core 14 with neutron absorbing liquid in the unlikely event the normal operational injection control rods malfunction.

The transfer of emergency neutron absorbing solution 42 from supply tank 44 through conduit 50 to the reactor vessel 12 is controlled by a flow injection valve 52 provided in conduit 50. Valve 52 opens in response to a signal from a sensing device 54 monitoring the operation of the control rods 18 which is passed to a valve actuating mechanism 56 operating flow injection valve 52.

A pressure sensing device 58 monitors the propelling gas pressure within the supplementary cooling water reserve tank 22 and controls a valve actuating mechanism 60 which operates valve 62 in gas supply pipe 30 communicating with high pressure gas supply tank 28. Thus, the pressure of the propelling gas in tank 22 for forcing cooling water 24 when needed from reservoir tank 22 through fluid conduit 32 into the reactor vessel 12 can automatically be maintained within an appropriate range by suitable additions of pressurized gas from the high pressure gas supply tank 28.

Similarly a pressure sensing device 64 monitors the propelling gas pressure within the emergency neutron absorbing solution supply tank 44 and controls a valve actuating mechanism 66 which operates valve 68 in pipe 46 communicating with high pressure gas supply tank 28. The pressure of the propelling gas in tank 44 for forcing neutron absorbing solution 42 when needed from reservoir tank 44 through fluid conduit 50 into the reactor vessel 12 accordingly can automatically be maintained within an appropriate range by suitable additions of pressurized gas from the high pressure gas supply tank 28.

In the event the gas pressure within the high pressure gas supply tank 28 is insufficient to pressurize by passive flow action either tank 44 or tank 22 up to its required initial operating pressure, it is routine to provide a gas compressor of suitable design and driving means to accomplish the charging task.

Typically the propellant gas pressure is maintained at different levels, or ranges, in the supplementary water coolant tank 22 and neutron absorption solution supply tank 44, and these tanks are of substantially different size or volume to correspond with their respective functions. The supplementary water coolant tank 22 normally would be of much greater size for the purpose of containing a large reserve volume of water coolant 24 to supplant significant losses from the reactor of reactor coolant 16 over a period of time, whereas the neutron absorbent solution 42 is generally needed only in an amount sufficient to produce a dilute but effective concentration within coolant 16 of neutron absorbing solution and thus to bring fuel core 14 subcritical in the absence of control rod action. The propellant gas pressure within the supplementary water coolant tank 22 is relatively low since it is generally required to drive the supplemental water coolant into a reactor system which is losing pressurization and coolant due to a breach, for example about 400 pounds per square inch gauge.

However, to maintain needed effectivity of the initial propellant gas within tank 22 while reserve coolant 24 is being discharged through conduit 32 and to the point of depletion within tank 22, the physical size of the initial gas volume with tank 22 is necessarily relatively large, such as being one or more multiples (plus/minus) of the coolant 24 initial volume. The consequence of this is that tank 22 can in the practice become a bulky heavy tank presenting onerous problems concerning its manufacturing, shipping, installation, and space accommodation within costly plant building structure among other problems which attend such bulky heavy equipment. Propellant gas pressure within neutron absorption solution supply tank 44 is relatively high so that it can drive the solution into the reactor vessel 12 even under scenario in which reactor pressure develops to become untypically high, for example about 1500 pounds per square inch gauge.

According to this invention the propellant pressurized gas supply and gas distribution means associated with tanks 22 and 44 are integrated by interconnecting the pressurized supplementary water coolant tank 22 with the pressurized emergency neutron absorption solution supply tank 44 for the purpose of transferring pressurized gas, suitably conditioned in pressure directly between tanks 44 to 22. Referring to FIG. 1, a conduit 70 makes fluid communication directly between the upper gas containing area of emergency neutron absorption solution tank 44 and supplementary water coolant tank 22. Fluid flow through conduit 70 is regulated by flow control valve 72. Flow control valve 72 is operated by valve actuating mechanism and pressure monitoring and sensing device 74 which measures the pressure in both tanks 22 and 44. Pressure monitoring devices 74, for example, can be programmed to actuate flow control valve 72 and permit the flow of pressurized gas from one of the tanks 44 or 22 to the other tank when the pressurization of one tank is reduced to a predetermined low level, due either to its dissipation from driving liquid to the reactor vessel 12, or simply leakage.

This arrangement of the invention provides a significant safety factor by providing an added source or reservoir of standby pressurized gas propellant for effectively driving either the supplementary coolant water to the reactor vessel for maintaining moderate temperature, or the emergency neutron absorbing solution to the reactor fuel core for terminating the fission reaction.

In addition to enhancing safety, this arrangement affords economics in the plant facilities such as the size of reservoir tanks for containing the supplementary coolant water and pressurized gas propellant, or the emergency neutron absorbent solution and pressurized gas propellant. This can be attributable to reducing the tank volume or size utilized to contain the pressurized gas propellant in the area above the liquid since an additional standby source pressurized gas propellant is available to augment the gas content of either tank.

Another advantageous aspect of this invention is an automatic cut-off arrangement which precludes the introduction of gas propellant into the reactor vessel 12 though either the auxiliary water coolant system 20 or the emergency neutron absorption solution system 40. A liquid level measuring system is applied to each the supplementary water coolant tank 22 and the neutron absorption solution supply tank 44 and provided with control means to terminate all fluid flow from these tanks to the reactor vessel 12 upon a reduction of their liquid content to a predetermined minimum level therein.

Supplementary water coolant tank 22 is provided with a liquid level sensor 76 which registers a minimum liquid level within tank 44. Sensor 76 regulates valve actuating mechanism(s) 78 (78') which operates flow control valve(s) 80 (80'). Thus, when the water coolant in tank 22 is reduced by discharge to a predetermined level, flow control valve(s) 80 (80') closes to prevent flow though coolant pipe 32 from tank 22 to the reactor vessel 12. Multiple flow control valves 80 can be used to insure positive performance through duplication of the units.

Similarly neutron absorption solution supply tank 44 is provided with a liquid level sensor 82 which registers a minimum liquid level within tank 44. Sensor 82 regulates valve actuating mechanism(s) 84 which operate flow control valve(s) 86. Accordingly when the neutron absorbent solution tank 44 is reduced to a predetermined level, flow control valve(s) 86 closes to prevent flow through solution pipe 50 from tank 44 to the reactor vessel 12. Also multiple flow control valves 86 can be used to insure positive performance, such as the 10 valves 80 and 80' in supplementary coolant pipe 32 and valve control mechanisms 78 and 78'.

To further insure that any gas propellant does not escape from either supplementary water coolant tank 22 or neutron absorption solution supply tank 44 and enter the reactor, optionally each tank is provided with a float operated valve 88 and 88', housed within a cage, having a valve means for descending down to and closing off the bottom tank outlets when their liquid contents recede to given low point.

To preclude any possibility of radioactive contaminated coolant water circulating about through the nuclear reactor vessel 12 and coolant/steam circuit from flowing back through supplementary water coolant injection pipe 32, a check valve 90 is preferably provided at the discharge end of pipe 32 within reactor vessel 12.

The portion of conduit 32 downstream (i.e., on the reactor-side) of squib valves 34 is typically pressurized internally to reactor operating pressures. Accordingly, this pipe segment is included among that group of pipe segments and appurtenances to reactor 12 the rupture of which (segments/appurtenances) are one-at-a-time taken as hypothetical initiating events which, together with other presumed happenstances, comprise the spectrum of accident scenarios for which coolant injection system 20 is intended to provide mitigating relief. Rupture of the subject pipe segment along conduit 32 could thus represent the initiating event in the hypothetical accident scenario, which in turn would foreclose the possibility for coolant 24 in tank 22 from reaching reactor 12. To address the need by the reactor for coolant injection irrespective of the initiating event, heretofore it has been commonplace in the art for the reactor designer to provide redundant coolant injection systems 20 each with dedicated injection lines 32, 32'. In many cases, this has led to large extra costs for these backup systems, and to extra and costly demands within the reactor auxiliary building for space to house the backup components.

An additional novel feature of this invention is now herewith disclosed, depicted in FIG. 2, being the incorporation of a removable check valve 90, normally-closed, positioned at the in-reactor terminus of a "safe-end" 92, which latter object is in the art understood to be an inward-to-the-reactor projecting pipelike segment communicating with an external line such as line 32, and suitably terminated in the reactor vessel with a removable check valve 90 affixed to safe-end 92 via clamp 94. Check valve 90 affords near-zero flow resistance to inwardly directed flow coming through safe-end 92, but presents virtually infinite flow resistance to any outwardly directed flow moving through safe-end 92.

Rupture of safe-end 92 is ordinarily not held to be a credible initiating event because of the fact that pressure within and without safe-end 92 is normally identical or nearly so; accordingly, mechanical stresses are ordinarily near-zero, and thus catastrophic rupture is not credible.

Rupture of line 32 is, however, a credible initiating event; but with line 32 communicated with inside-the-reactor safe-end 32 and check valve 90, it is at once evident that catastrophic rupture of line 32 is inherently promptly mitigated by the action of check valve 90 in its normally-closed state, limiting leakage of reactor coolant outwardly through line 32 to zero or to nearly-zero values and thus generally obviating the need for reactor safety coolant injection systems—such as coolant injection system 20—to have to function. Instead, ordinary reactor shutdown and depressurization actions are taken by the plant operator or the nuclear reactor's automatic systems upon the detection of the hypothesized catastrophic rupture (=initiating event). Check valve 90 is not required to be leak-tight, but only to be capable of limiting outleakage to a low flow rate the specific amount of which being nominally that of the reactor's ordinary high-pressure coolant makeup system assuming unavailability of feedwater (this assumption typically being part of the hypothetical accident scenario of events).

By utilizing the novel combination of safe-end 92 and normally-closed check valve 90 affixed thereto with clamp 94, it becomes possible to derive the otherwise unanticipated benefit of eliminating the backup safety coolant injection system for nuclear reactor plants the design basis accidents for which involve no greater than one catastrophic rupture of a pressurized pipeline segment together with any other single active failure.

It is also preferred in this invention that flow control valves 34 and 52, respectively in supplementary coolant pipe 32 leading from tank 22 to vessel 12 and in emergency solution pipe 50 leading from tank 44 to vessel, consist of multiple parallel valves such as the pairs of valves, 34 and 52, arranged in parallel as shown in the drawing. Additionally it is preferred that the valves 34 and 52, either single or in parallel pairs, be of the explosive charge type whereby an explosive charge functions to remove the valve closure blocking flow through the coolant injection pipe 26 and the solution injection pipe 50.

Additionally a squib-type, or explosive activated valve 96 is preferably located in conduit 70 which opens in response to a logic system signal as a means of providing a highly reliable non-leak isolating action of the high pressure gas in tank 44 from bleeding down into low pressure tank 22. In this embodiment, sensor means 36 and 54 can be used together with appropriate logic systems to initiate a valve-operating means 98 to open valve 96. Also valve 96 can be provided as dual valves in parallel such as shown for valve 34 in the drawing.

What is claimed is:

1. A multiple liquid standby safety injection system for nuclear reactor plants, comprising the combination of:

a nuclear reactor plant including a reactor pressure vessel containing a core of fissionable nuclear fuel;

a first water tank for containing cooling water and gas under pressure for propelling the water through an injection system including a valve controlled conduit making fluid communication from said first tank to the nuclear reactor pressure vessel above the fuel core for supplying cooling water to the fissionable fuel during an emergency;

a second solution tank for containing a water solution of a soluble neutron absorbent compound and gas under high pressure for propelling the neutron absorbent water solution through an injection system including a valve controlled conduit making fluid communication from said second tank to the nuclear reactor pressure vessel for supplying neutron absorbent solution to the core of fissionable fuel during an emergency;

a source of high pressure compressed propelling gas having a valve controlled conduit making fluid communication therefrom to each the first water tank and the second solution tank to provide pressurized gas to the tanks for propelling their contents through their respective injection systems into the nuclear reactor pressure vessel by means of their respective valve controlled conduits;

sensing means monitoring the nuclear reactor pressure vessel operating the valves controlling flow in the conduits making fluid communication between the first water tank and the pressure vessel, and between the second solution tank and the pressure vessel; and a propellant pressurized gas supply and distribution system comprising a fluid conveying conduit having a flow controlling valve making fluid communication between the first water tank and the second solution tank and having pressure monitoring and sensing means in both the first water tank and second solution tank for regulating an actuating mechanism operating the flow controlling valve whereby fluid flow of pressurized gas between the first water tank and the second solution tank is determined by their relative pressures.

2. A multiple liquid standby safety injection system for nuclear reactor plants of claim 1, wherein the first water tank is provided with a liquid level measuring means for monitoring the level of a liquid within the tank and regulating a valve activating mechanism operating a flow control valve in the conduit making fluid communication from said first tank to the nuclear reactor pressure vessel for terminating fluid flow from the first water tank to the pressure vessel.

3. A multiple liquid standby safety injection system for nuclear reactor plants of claim 1, wherein the second solution tank is provided with a liquid level measuring means for monitoring the level of a liquid within the tank and which regulates a valve actuating mechanism operating a flow control valve in the conduit making fluid communication from said second tank to the nuclear reactor pressure vessel for terminating fluid flow from the second solution tank to the pressure vessel.

4. A multiple liquid standby safety injection system for nuclear reactor plants of claim 1, wherein the terminal end of the conduit making fluid communication from the first water tank to the nuclear reactor pressure vessel is provided with a flow check valve in a normally closed state thereby preventing back-flow.

5. A multiple liquid standby safety injection system for nuclear reactor plants, comprising the combination of:
- a nuclear reactor plant including a reactor pressure vessel containing a core of fissionable nuclear fuel;
- a first water tank for containing cooling water and gas under pressure for propelling the cooling water through an injection system including a valve controlled conduit making fluid communication from said first tank to the nuclear reactor pressure vessel above the fuel core contained therein for supplying supplemental cooling water to the fissionable fuel during an emergency;
- a second solution tank for containing a water solution of a soluble neutron absorbent compound and a gas under high pressure for propelling water solution through an injection system including a valve controlled conduit making fluid communication from said second tank to the nuclear reactor pressure vessel adjacent to the fuel core for supplying neutron absorbent solution to the core of fissionable fuel during a emergency;
- a source of high pressure compressed propelling gas having a valve controlled conduit making fluid communication therefrom to each the first water tank and the second solution tank for providing pressurized gas to each tank for propelling their liquid contents through their respective injection systems into the nuclear reactor pressure vessel by means of their respective valve controlled conduits;
- sensing means monitoring conditions in the nuclear reactor pressure vessel for operating the valves controlling flow through the conduits making fluid communication between the first water tank and the pressure vessel;
- a propellant pressurized gas supply and distribution system comprising a fluid conveying conduit having a flow controlling valve making fluid communication between the first water tank and the second solution tank and having pressure monitoring and sensing means in both the first water tank and second solution tank for regulating an actuating mechanism operating the flow controlling valve in the fluid conveying conduit making fluid communication between the first water tank and the second solution tank whereby fluid flow of pressurized gas between the first water tank and the second solution tank is determined by their relative pressures; and
- liquid level measuring means for monitoring the level of a liquid within each the first water tank and the second solution tank and regulating valve activating mechanisms operating a first flow control valve in the conduit making fluid communication from said first tank to the nuclear reactor pressure vessel, and a second flow control valve in the conduit making fluid communication from said second solution tank to the nuclear reactor pressure vessel, said first and second flow control valves terminating fluid flow from said tanks to the pressure vessel when a predetermined low level of liquid within the respective tank occurs.

6. The multiple liquid standby safety injection system for nuclear reactor plants of claim 5, wherein the terminal end of the conduit making fluid communication from the first water tank to the nuclear reactor pressure vessel is provided with a flow check valve in a normally closed state thereby preventing back-flow of fluid from the nuclear reactor pressure vessel into the conduit.

7. A multiple liquid standby safety injection system for nuclear reactor plants of claim 5, wherein the first water tank is provided with a liquid level measuring float valve for closing off the conduit making fluid communication from said first water tank to the nuclear reactor pressure vessel.

8. A multiple liquid standby safety injection system for nuclear reactor plants of claim 5, wherein the second solution tank is provided with a liquid level measuring float valve for closing off the conduit from said second solution tank to the nuclear reactor pressure vessel.

9. A multiple liquid standby safety injection system for nuclear reactor plants of claim 5, wherein the valve controlled conduits making fluid communication respectively from the first and second tanks to the nuclear reactor pressure vessel each include dual parallel control valves.

10. A multiple liquid standby safety injection system for nuclear reactor plants, comprising the combination of:
- a nuclear reactor plant including a reactor pressure vessel containing a core of fissionable nuclear fuel;
- a first water tank for containing cooling water and gas under pressure for propelling the water through an injection system including a valve controlled conduit making fluid communication from said first water tank to the nuclear reactor pressure vessel above the fuel core for supplying cooling water to the fissionable fuel during an emergency;
- a second solution tank for containing a water solution of a soluble neutron absorbent comprised compound and gas under high pressure for propelling the neutron absorbent water solution through an injection system including a valve controlled conduit making fluid communication from said second solution tank to the nuclear reactor pressure vessel for supplying neutron absorbent solution to the core of fissionable fuel during an emergency;
- a source of high pressure compressed propelling gas having a valve controlled conduit making fluid communication therefrom to each the first water tank and the second solution tank to provide pressurized gas to the tanks for propelling their contents through their respective injection system into the reactor pressure vessel by means of their respective valve controlled conduits;
- sensing means monitoring the nuclear reactor pressure vessel and operating the valves controlling fluid flow in the conduits making fluid communication between the first water tank and the reactor pressure vessel, and between the second solution tank and the reactor pressure vessel;
- a propellant pressurized gas supply and distribution system comprising a fluid conveying conduit having a flow controlling valve making fluid communication between the first water tank and the second solution tank and having pressure monitoring and sensing means in both the first water tank and second solution tank for regulating an actuating mechanism operating the flow controlling valve in the fluid conveying conduit making fluid communication between said first and second tanks whereby fluid flow of pressurized gas between the first water tank and the second solution tank can be determined by their relative pressure;

liquid level measuring means for monitoring the level of a liquid within each of the first water tank and the second solution tank, a regulating valve activating mechanism operating a flow control valve in the conduit making fluid communication from said first water tank to the reactor pressure vessel, and a regulating valve activating mechanism operating a flow control valve in the conduit making fluid communication from said second solution vessel to the reactor pressure vessel for selectively terminating fluid flow from said tanks to the pressure vessel when a predetermined low level of liquid occurs within a tank; and, said first water tank and second solution tank each being provided with a liquid level measuring float valve for closing off the respective conduits making fluid communication from each tank to the nuclear reactor pressure vessel when a predetermined low level of liquid occurs within each tank.

11. A multiple liquid standby safety injection system for nuclear reactor plants of claim 10, wherein the valve controlled conduits making fluid communication respectively from the first water tank and the second solution tank to the reactor pressure vessel each include dual parallel control valves.

12. A multiple liquid standby safety injection system for nuclear reactor plants of claim 10, wherein the terminal end of the conduit making fluid communication from the first water tank to the nuclear reactor pressure vessel is provided with a flow check valve located entirely within said reactor vessel and which prevents back-flow of fluid from the nuclear reactor pressure vessel into the conduit.

13. A multiple liquid standby safety injection system for nuclear reactor plants of claim 10, wherein the valve controlled conduit making fluid communication from the first water tank and the second solution tank includes a squib-type valve.

14. A multiple liquid standby safety injection system for nuclear reactor plants of claim 10, wherein the conduit making fluid communication from the first water tank and the second solution tank comprises at least one squib-type flow controlling valve operated by a logic system signal.

15. A multiple liquid standby safety injection system for nuclear reactor plants of claim 10, where the conduit making fluid communication from the first water tank to the second solution tank comprises multiple flow control valves with at least one explosive operated valve.

16. A multiple liquid standby safety injection system for nuclear reactor plants of claim 12, wherein the flow check valve in the terminal end of the conduit making fluid communication from the first water tank to the nuclear reactor pressure vessel is in a normally closed state.

* * * * *